(12) United States Patent
Han et al.

(10) Patent No.: US 9,907,095 B2
(45) Date of Patent: Feb. 27, 2018

(54) USER EQUIPMENT AND EVOLVED NODE-B AND METHODS FOR RANDOM ACCESS FOR MACHINE TYPE COMMUNICATION

(71) Applicant: Intel IP Corporation, Santa Clara, CA (US)

(72) Inventors: Seunghee Han, San Jose, CA (US); Gang Xiong, Beaverton, OR (US)

(73) Assignee: Intel IP Corporation, Santa Clara, CA (US)

( * ) Notice: Subject to any disclaimer, the term of this patent is extended or adjusted under 35 U.S.C. 154(b) by 23 days.

(21) Appl. No.: 15/111,762

(22) PCT Filed: Feb. 24, 2015

(86) PCT No.: PCT/US2015/017235
§ 371 (c)(1),
(2) Date: Jul. 14, 2016

(87) PCT Pub. No.: WO2015/127424
PCT Pub. Date: Aug. 27, 2015

(65) Prior Publication Data
US 2016/0338111 A1    Nov. 17, 2016

Related U.S. Application Data

(60) Provisional application No. 61/943,979, filed on Feb. 24, 2014.

(51) Int. Cl.
*H04W 4/00* (2009.01)
*H04W 74/08* (2009.01)
*H04L 5/00* (2006.01)

(52) U.S. Cl.
CPC ....... *H04W 74/0833* (2013.01); *H04L 5/0053* (2013.01); *H04W 4/005* (2013.01)

(58) Field of Classification Search
CPC .................................................. H04W 74/0833
(Continued)

(56) References Cited

U.S. PATENT DOCUMENTS

2013/0039309 A1    2/2013    Chiu

FOREIGN PATENT DOCUMENTS

| CN | 106416115 | 2/2017 |
| KR | 1020160110396 | 9/2016 |
| WO | WO-2015127424 A1 | 8/2015 |

OTHER PUBLICATIONS

"Coverage Improvement for PRACH", R1-140115, 3GPP TSG RAN WGI Meeting #76, Prague. Czech Republic, (Feb. 1, 2014), 1-9.

(Continued)

*Primary Examiner* — Shripal Khajuria
(74) *Attorney, Agent, or Firm* — Schwegman Lundberg & Woessner, P.A.

(57) ABSTRACT

Embodiments of a User Equipment (UE) and an Evolved Node-B (eNB) and methods for random access are generally described herein. As part of a random access procedure, the UE may transmit a physical random access channel (PRACH) preamble in a first portion of PRACH time and frequency resources and may receive a physical downlink shared channel (PDSCH) block that includes a random access response (RAR) to the PRACH preamble. The PDSCH block may be based on a random access radio network temporary identifier (RA-RNTI) associated with the first portion of the PRACH resources. Accordingly, the UE may use the RA-RNTI to determine that the PDSCH block is intended for the UE without usage of physical downlink control channel (PDCCH) blocks for the PDSCH block. In some embodiments, the UE may be configured for machine-type communication (MTC).

32 Claims, 6 Drawing Sheets

(58) Field of Classification Search
USPC .......................................................... 370/329
See application file for complete search history.

(56) References Cited

OTHER PUBLICATIONS

"Discussion on Multi-level Prach Coverage Enhancement", NTT DOCOMO R1-140616, 3GPP TSG RAN WGI Meeting #76, Prague, Czech Republic, (Feb. 1, 2014), 1-6.
"International Application Serial No. PCT/US2015/017235, International Search Report dated Apr. 28, 2015", 3 pgs.
"International Application Serial No. PCT/US2015/017235, Written Opinion dated Apr. 28, 2015", 10 pgs.
"PRACH Coverage Enhancements for MTC UEs", Samsung, RI-140355, 3GPP TSG RAN WG1 Meeting #76, Prague, Czech Republic, (Feb. 1, 2014), 1-5.
Alcatel, Lucent, et al., "Coverage enhancement for RACH messages", R1-140153, 3GPP T.SG RAN WG1 Meeting #76, Prague. Czech Republic, (Jan. 31, 2014), 1-5.
"International Application Serial No. PCT/US2015/017235, International Preliminary Report on Patentability dated Sep. 9, 2016", 12 pgs.
"Chinese Application Serial No. 201580005489.4, Voluntary Amendment Filed on Jun. 6, 2017", (W/ English Translation), 15 pgs.
"Korean Application Serial No. 10-2016-7019873, Notice of Preliminary Rejection dated Aug. 20, 2017", 7 pgs.

USER EQUIPMENT AND EVOLVED NODE-B AND METHODS FOR RANDOM ACCESS FOR MACHINE TYPE COMMUNICATION

PRIORITY CLAIM

This application is a U.S. National Stage Filing under 35 U.S.C. 371 from International Application No. PCT/US2015/017235, filed Feb. 24, 2015 and published in English as WO 2015/127424 on Aug. 27, 2015, which claims priority to United States Provisional Patent Application Serial No. 61/943,979, filed Feb. 24, 2014, each of which is incorporated herein by reference in its entirety.

TECHNICAL FIELD

Embodiments pertain to wireless communications. Some embodiments relate to wireless networks including 3GPP (Third Generation Partnership Project) networks, 3GPP LTE (Long Term Evolution) networks, and 3GPP LTE-A (LTE Advanced) networks, although the scope of the embodiments is not limited in this respect. Some embodiments relate to operation in a coverage enhancement mode. Some embodiments relate to Machine Type Communication (MTC). Some embodiments relate to random access procedures.

BACKGROUND

A wireless network may communicate with User Equipment (UE) or other devices configured for Machine Type Communication (MTC) operation. As such, small blocks of data may be exchanged between the UE and the network at infrequent rates. In some cases, performance capabilities or requirements of an MTC UE may be reduced in comparison to other UEs, for reasons such as device cost or power usage. As an example, the MTC UE may be designed with reduced processing capability and/or memory. As another example, the MTC UE may be able to operate in a power saving state or other similar state. In these and other cases, MTC UEs and other UEs may benefit from reduced processing requirements for communication with the network, and thus there is a general need for related methods and systems. In particular, such methods and systems may be applicable to random access procedures for establishing or re-establishing communication between the UEs and the network.

DETAILED DESCRIPTION

The following description and the drawings sufficiently illustrate specific embodiments to enable those skilled in the art to practice them. Other embodiments may incorporate structural, logical, electrical, process, and other changes. Portions and features of some embodiments may be included in, or substituted for, those of other embodiments. Embodiments set forth in the claims encompass all available equivalents of those claims.

Figure 1:
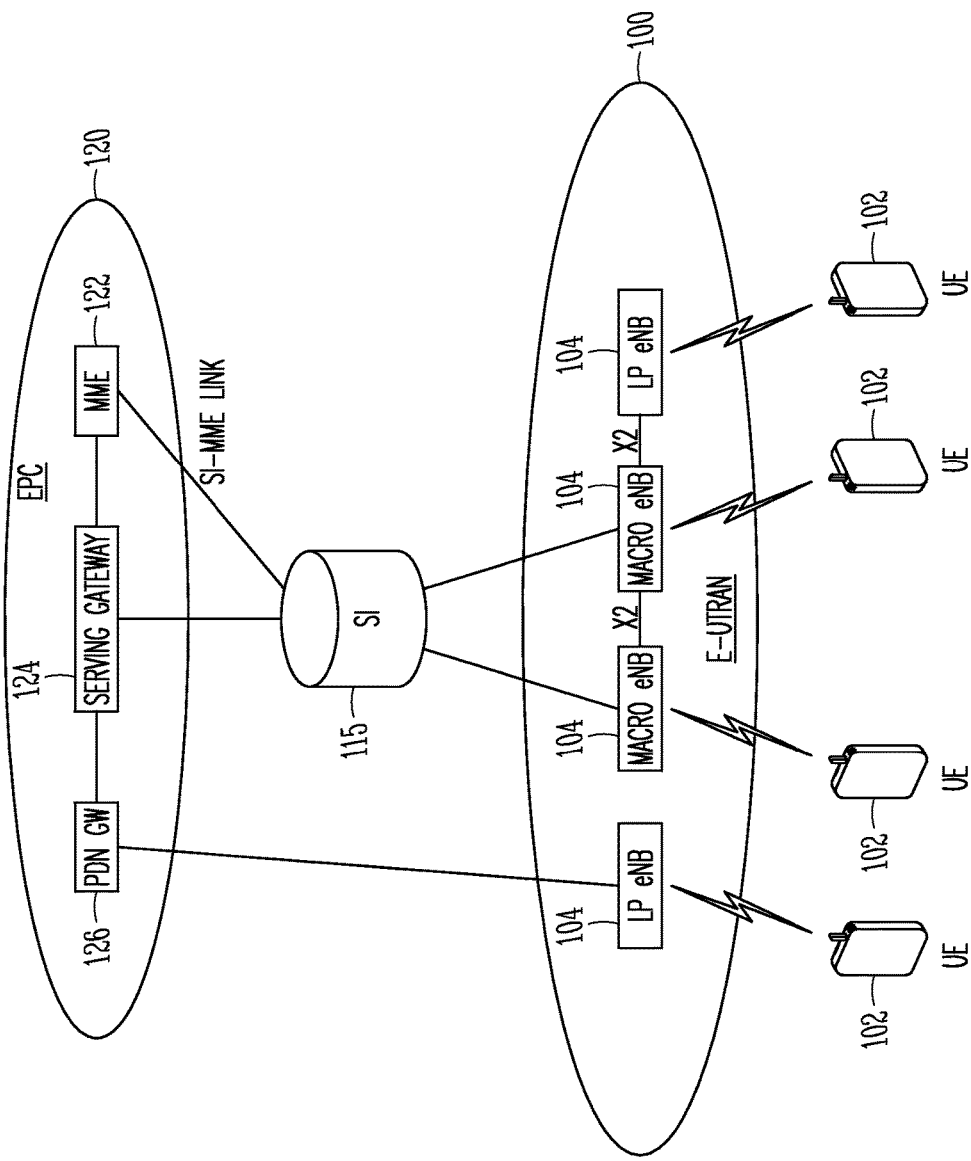
FIG. 1 is a functional diagram of a 3GPP network in accordance with some embodiments.

FIG. 1 is a functional diagram of a 3GPP network in accordance with some embodiments. The network comprises a radio access network (RAN) (e.g., as depicted, the E-UTRAN or evolved universal terrestrial radio access network) 100 and the core network 120 (e.g., shown as an evolved packet core (EPC)) coupled together through an S1 interface 115. For convenience and brevity sake, only a portion of the core network 120, as well as the RAN 100, is shown.

The core network 120 includes a mobility management entity (MME) 122, a serving gateway (serving GW) 124, and packet data network gateway (PDN GW) 126. The RAN 100 includes Evolved Node-B's (eNBs) 104 (which may operate as base stations) for communicating with User Equipment (UE) 102. The eNBs 104 may include macro eNBs and low power (LP) eNBs. In accordance with some embodiments, the UE 102 may transmit a physical random access channel (PRACH) preamble as part of a random access procedure with the eNB 104. The UE 102 may receive a physical downlink shared channel (PDSCH) block from the eNB 104 during a downlink sub-frame, and may refrain from reception of decoding of physical downlink control channel (PDCCH) blocks for the downlink sub-frame.

The MME 122 is similar in function to the control plane of legacy Serving GPRS Support Nodes (SGSN). The MME 122 manages mobility aspects in access such as gateway selection and tracking area list management. The serving GW 124 terminates the interface toward the RAN 100, and routes data packets between the RAN 100 and the core network 120. In addition, it may be a local mobility anchor point for inter-eNB handovers and also may provide an anchor for inter-3GPP mobility. Other responsibilities may include lawful intercept, charging, and some policy enforcement. The serving GW 124 and the MME 122 may be implemented in one physical node or separate physical nodes. The PDN GW 126 terminates an SGi interface toward the packet data network (PDN). The PDN GW 126 routes data packets between the EPC 120 and the external PDN, and may be a key node for policy enforcement and charging data collection. It may also provide an anchor point for mobility with non-LTE accesses. The external PDN can be any kind of IP network, as well as an IP Multimedia Subsystem (IMS) domain. The PDN GW 126 and the serving GW 124 may be implemented in one physical node or separated physical nodes.

The eNBs 104 (macro and micro) terminate the air interface protocol and may be the first point of contact for a UE 102. In some embodiments, an eNB 104 may fulfill various logical functions for the RAN 100 including but not limited to RNC (radio network controller functions) such as radio bearer management, uplink and downlink dynamic radio resource management and data packet scheduling, and mobility management. In accordance with embodiments, UEs 102 may be configured to communicate Orthogonal Frequency Division Multiplexing (OFDM) communication signals with an eNB 104 over a multicarrier communication channel in accordance with an Orthogonal Frequency Division Multiple Access (OFDMA) communication technique. The OFDM signals may comprise a plurality of orthogonal subcarriers.

The S1 interface 115 is the interface that separates the RAN 100 and the EPC 120. It is split into two parts: the S1-U, which carries traffic data between the eNBs 104 and the serving GW 124, and the S1-MME, which is a signaling interface between the eNBs 104 and the MME 122. The X2interface is the interface between eNBs 104. The X2 interface comprises two parts, the X2-C and X2-U. The X2-C is the control plane interface between the eNBs 104, while the X2-U is the user plane interface between the eNBs 104.

With cellular networks, LP cells are typically used to extend coverage to indoor areas where outdoor signals do not reach well, or to add network capacity in areas with very dense phone usage, such as train stations. As used herein, the term low power (LP) eNB refers to any suitable relatively low power eNB for implementing a narrower cell (narrower than a macro cell) such as a femtocell, a picocell, or a micro cell. Femtocell eNBs are typically provided by a mobile network operator to its residential or enterprise customers. A femtocell is typically the size of a residential gateway or smaller and generally connects to the user's broadband line. Once plugged in, the femtocell connects to the mobile operator's mobile network and provides extra coverage in a range of typically 30 to 50 meters for residential femtocells. Thus, a LP eNB might be a femtocell eNB since it is coupled through the PDN GW 126. Similarly, a picocell is a wireless communication system typically covering a small area, such as in-building (offices, shopping malls, train stations, etc.), or more recently in-aircraft. A picocell eNB can generally connect through the X2 link to another eNB such as a macro eNB through its base station controller (BSC) functionality. Thus, LP eNB may be implemented with a picocell eNB since it is coupled to a macro eNB via an X2 interface. Picocell eNBs or other LP eNBs may incorporate some or all functionality of a macro eNB. In some cases, this may be referred to as an access point base station or enterprise femtocell.

In some embodiments, a downlink resource grid may be used for downlink transmissions from an eNB 104 to a UE 102, while uplink transmission from the UE 102 to the eNB 104 may utilize similar techniques. The grid may be a time-frequency grid, called a resource grid or time-frequency resource grid, which is the physical resource in the downlink in each slot. Such a time-frequency plane representation is a common practice for OFDM systems, which makes it intuitive for radio resource allocation. Each column and each row of the resource grid correspond to one OFDM symbol and one OFDM subcarrier, respectively. The duration of the resource grid in the time domain corresponds to one slot in a radio frame. The smallest time-frequency unit in a resource grid is denoted as a resource element (RE). Each resource grid comprises a number of resource blocks (RBs), which describe the mapping of certain physical channels to resource elements. Each resource block comprises a collection of resource elements in the frequency domain and may represent the smallest quanta of resources that currently can be allocated. There are several different physical downlink channels that are conveyed using such resource blocks. With particular relevance to this disclosure, two of these physical downlink channels are the physical downlink shared channel and the physical down link control channel.

The physical downlink shared channel (PDSCH) carries user data and higher-layer signaling to a UE 102 (FIG. 1). The physical downlink control channel (PDCCH) carries information about the transport format and resource allocations related to the PDSCH channel, among other things. It also informs the UE 102 about the transport format, resource allocation, and hybrid automatic repeat request (HARQ) information related to the uplink shared channel. Typically, downlink scheduling (e.g., assigning control and shared channel resource blocks to UEs 102 within a cell) may be performed at the eNB 104 based on channel quality information fed back from the UEs 102 to the eNB 104, and then the downlink resource assignment information may be sent to a UE 102 on the control channel (PDCCH) used for (assigned to) the UE 102.

The PDCCH uses CCEs (control channel elements) to convey the control information. Before being mapped to resource elements, the PDCCH complex-valued symbols are first organized into quadruplets, which are then permuted using a sub-block inter-leaver for rate matching. Each PDCCH is transmitted using one or more of these control channel elements (CCEs), where each CCE corresponds to nine sets of four physical resource elements known as resource element groups (REGs). Four QPSK symbols are mapped to each REG. The PDCCH can be transmitted using one or more CCEs, depending on the size of DCI and the channel condition. There may be four or more different PDCCH formats defined in LTE with different numbers of CCEs (e.g., aggregation level, L=1, 2, 4, or 8).

Figure 2:
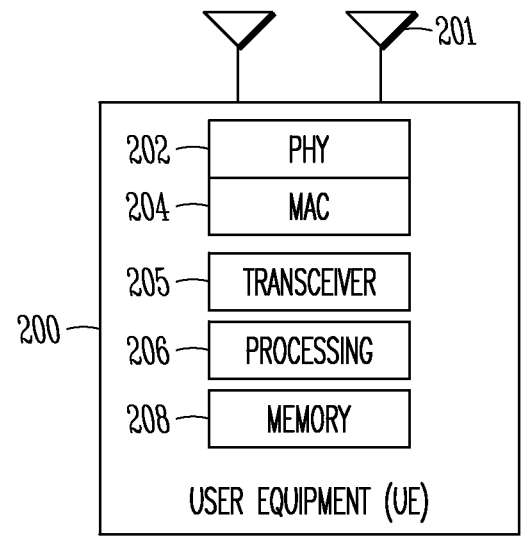
FIG. 2 is a block diagram of a User Equipment (UE) in accordance with some embodiments.
Figure 3:
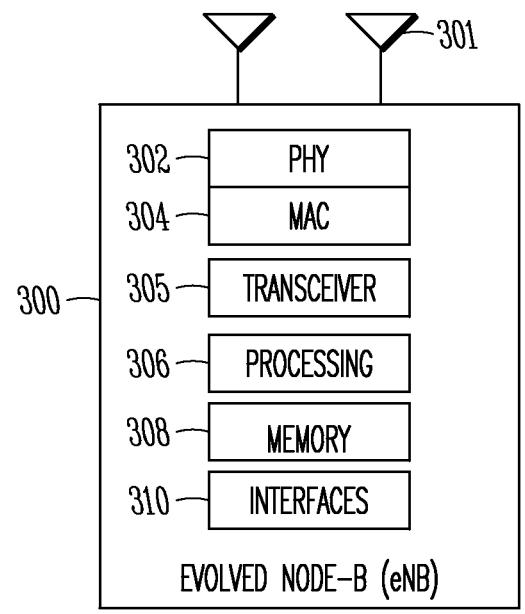
FIG. 3 is a block diagram of an Evolved Node-B (eNB) in accordance with some embodiments.

FIG. 2 is a functional diagram of a User Equipment (UE) in accordance with some embodiments. FIG. 3 is a functional diagram of an Evolved Node-B (eNB) in accordance with some embodiments. It should be noted that in some embodiments, the eNB 300 may be a stationary non-mobile device. The UE 200 may be suitable for use as a UE 102 as depicted in FIG. 1, while the eNB 300 may be suitable for use as an eNB 104 as depicted in FIG. 1. The UE 200 may include physical layer circuitry 202 and a transceiver 205, one or both of which may enable transmission and reception of signals to and from the eNB 300, other eNBs, other UEs or other devices using one or more antennas 201. As an example, the physical layer circuitry 202 may perform various encoding and decoding functions that may include formation of baseband signals for transmission and decoding of received signals. As another example, the transceiver 205 may perform various transmission and reception functions such as conversion of signals between a baseband range and a Radio Frequency (RF) range. Accordingly, the physical layer circuitry 202 and the transceiver 205 may be separate components or may be part of a combined component. In addition, some of the described functionality related to transmission and reception of signals may be performed by a combination that may include one, any or all of the physical layer circuitry 202, the transceiver 205, and other components or layers.

The eNB 300 may include physical layer circuitry 302 and a transceiver 305, one or both of which may enable transmission and reception for transmission and reception of signals to and from the UE 200, other eNBs, other UEs or other devices using one or more antennas 301. The physical layer circuitry 302 and the transceiver 305 may perform various functions similar to those described regarding the UE 200 previously. Accordingly, the physical layer circuitry 302 and the transceiver 305 may be separate components or may be part of a combined component. In addition, some of the described functionality related to transmission and reception of signals may be performed by a combination that may include one, any or all of the physical layer circuitry 302, the transceiver 305, and other components or layers.

The UE 200 may also include medium access control layer (MAC) circuitry 204 for controlling access to the wireless medium, while the eNB 300 may also include a medium access control layer (MAC) circuitry 304 for controlling access to the wireless medium. The UE 200 may also include processing circuitry 206 and memory 208 arranged to perform the operations described herein. The eNB 300 may also include processing circuitry 306 and memory 308 arranged to perform the operations described herein. The eNB 300 may also include one or more interfaces 310, which may enable communication with other components, including other eNBs 104 (FIG. 1), components in the EPC 120 (FIG. 1) or other network components. In addition, the interfaces 310 may enable communication with other components that may not be shown in FIG. 1, including components external to the network. The interfaces 310 may be wired or wireless or a combination thereof.

The antennas 201, 301 may comprise one or more directional or omnidirectional antennas, including, for example, dipole antennas, monopole antennas, patch antennas, loop antennas, microstrip antennas or other types of antennas suitable for transmission of RF signals. In some multiple-input multiple-output (MIMO) embodiments, the antennas 201, 301 may be effectively separated to take advantage of spatial diversity and the different channel characteristics that may result.

In some embodiments, the UE 200 or the eNB 300 may be a mobile device and may be a portable wireless communication device, such as a personal digital assistant (PDA), a laptop or portable computer with wireless communication capability, a web tablet, a wireless telephone, a smartphone, a wireless headset, a pager, an instant messaging device, a digital camera, an access point, a television, a wearable device such as a medical device (e.g., a heart rate monitor, a blood pressure monitor, etc.), or other device that may receive and/or transmit information wirelessly. In some embodiments, the UE 200 or eNB 300 may be configured to operate in accordance with 3GPP standards, although the scope of the embodiments is not limited in this respect. Mobile devices or other devices in some embodiments may be configured to operate according to other protocols or standards, including IEEE 802.11 or other IEEE standards. In some embodiments, the UE 200, eNB 300 or other device may include one or more of a keyboard, a display, a non-volatile memory port, multiple antennas, a graphics processor, an application processor, speakers, and other mobile device elements. The display may be an LCD screen including a touch screen.

Although the UE 200 and the eNB 300 are each illustrated as having several separate functional elements, one or more of the functional elements may be combined and may be implemented by combinations of software-configured elements, such as processing elements including digital signal processors (DSPs), and/or other hardware elements. For example, some elements may comprise one or more microprocessors, DSPs, field-programmable gate arrays (FPGAs), application specific integrated circuits (ASICs), radio-frequency integrated circuits (RFICs) and combinations of various hardware and logic circuitry for performing at least the functions described herein. In some embodiments, the functional elements may refer to one or more processes operating on one or more processing elements.

Embodiments may be implemented in one or a combination of hardware, firmware and software. Embodiments may also be implemented as instructions stored on a computer-readable storage device, which may be read and executed by at least one processor to perform the operations described herein. A computer-readable storage device may include any non-transitory mechanism for storing information in a form readable by a machine (e.g., a computer). For example, a computer-readable storage device may include read-only memory (ROM), random-access memory (RAM), magnetic disk storage media, optical storage media, flash-memory devices, and other storage devices and media. Some embodiments may include one or more processors and may be configured with instructions stored on a computer-readable storage device.

In accordance with embodiments, the UE 102 may transmit a physical random access channel (PRACH) preamble in a first portion of PRACH time and frequency resources as part of a random access procedure with the eNB 104. The UE 102 may receive a physical downlink shared channel (PDSCH) block that includes a random access response (RAR) to the PRACH preamble. The PDSCH block may be based on a random access radio network temporary identifier (RA-RNTI) associated with the first portion of the PRACH resources. Accordingly, the UE 102 may use the RA-RNTI to determine that the PDSCH block is intended for the UE 102 without usage of physical downlink control channel (PDCCH) blocks for the PDSCH block. These embodiments are described in more detail below.

Figure 4:
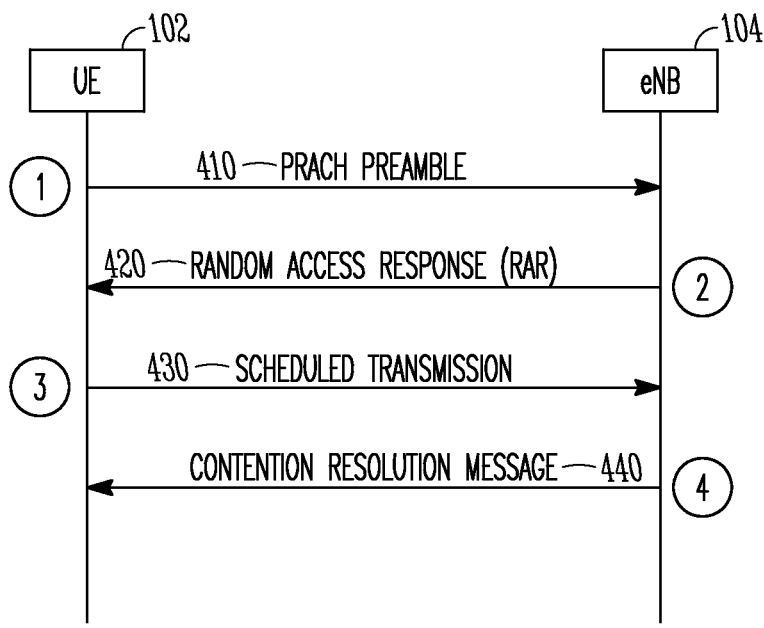
FIG. 4 illustrates examples of contention-based and non contention-based random access procedures between a UE and an eNB in accordance with some embodiments.
Figure 4:
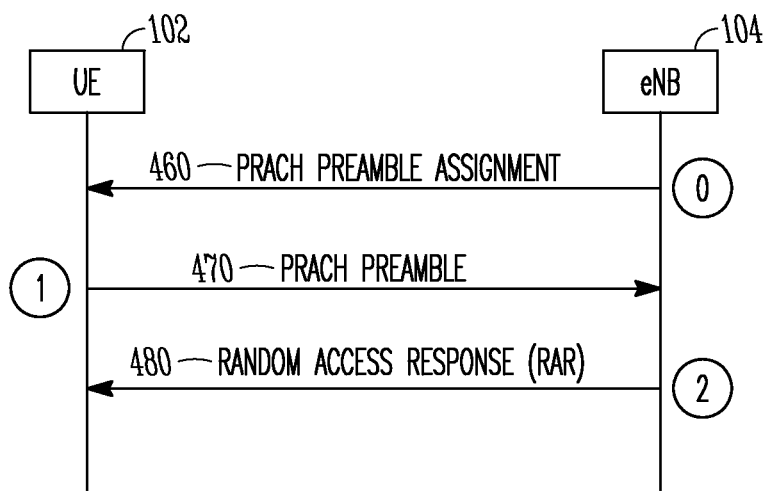

FIG. 4 illustrates examples of contention-based and non contention-based random access procedures between a UE 102 and an eNB 104 in accordance with some embodiments. Random access procedures may be used to establish connectivity between the UE 102 and the network (such as 100) or to reconnect the UE 102 with the network. Examples of random access procedures are shown in FIG. 4 for illustrative purposes, but it is understood that embodiments are not limited to these examples. The procedure 400 may be a contention-based random access procedure, while the procedure 450 may be a non contention-based random access procedure. The messages exchanged as part of the procedures 400, 450 may be included in 3GPP or other standards, but are not limited as such.

The contention-based procedure 400 may include transmission of a physical random access channel (PRACH) preamble 410 by the UE 102 to indicate to the eNB 104 an attempt to initiate the procedure 400. The eNB 104 may respond with a random access response (RAR) 420 to indicate reception of the PRACH preamble 410 and to provide information to the UE 102 regarding the scheduled transmission 430. Contention resolution message(s) 440 may be transmitted in some cases, such as when transmissions of multiple UEs 102 collide. It should be noted that messages 410-440 may be referred to as Msg-1, Msg-2, Msg-3, and Msg-4 in some cases, in accordance with the labels 1-4 shown in FIG. 4.

The non contention-based procedure 450 may include transmission of the PRACH preamble assignment 460 by the eNB 104. The UE 102 may transmit the PRACH preamble 470 according to the received PRACH preamble assignment 460. The RAR 480 may be transmitted by the eNB 104 in response to reception of the PRACH preamble 470. The messages 460-480 may also be referred to as Msg-0, Msg-1, and Msg-2 in accordance with labels 0-2 shown in FIG. 4.

In some cases, the UE 102 or other device may be configured to support Machine Type Communication (MTC). While some UEs 102 may be able to support both MTC operation and normal operation (i.e., non MTC) on a configurable basis, some UEs 102 may be designed as MTC UEs 102. In any case, MTC operation may refer to or may reflect exchanging of small blocks of data at an infrequent rate. The MTC UEs 102 may be designed with limited physical resources, which may be based on the cost, size or output power of the device or other design considerations. Accordingly, it may be beneficial or necessary to limit the number of messages and blocks that need to be decoded by the MTC UEs 102, which may include messages used for the random access procedure.

As a non-limiting example, the infrequent rate may be less than once per minute such that transmissions are spaced apart by at least one minute in some embodiments. The infrequent rate is not limited to less than once per minute, however, and may be less than once per second, 5 seconds, 10 seconds, minute, 5 minutes, 2 hours, 1 day or any suitably defined frequency. In addition, though not limited as such, the MTC operation may include exchanging of traffic packets or traffic blocks of data that may be characterized as "small" in comparison to typical sizes or supported sizes for UEs 102 operating in the normal mode. As an example, a small block of data used for MTC operation may include 1000 bits of data or fewer. This example is not limiting, however, as the small block of data may include less than 50 bits, 100 bits, 200 bits, 500 bits or any suitably defined number of bits, bytes or other digits.

As previously described, the random access procedure may be used to establish or re-establish connectivity between the UE 102 and the network. As an example, the UE 102 may be in an area in which network connectivity is particularly challenging. In this case, the UE 102 may be described as needing "coverage enhancement" or operating in a "coverage enhancement mode." Techniques such as repetition diversity of transmitted messages may be employed when the UE 102 is in the coverage enhancement mode in order to make up for a shortfall or a margin of a received signal level or signal quality at the UE 102. In these and other cases, it may be beneficial to limit the number of messages and blocks that need to be decoded by the UE 102.

Figure 5:
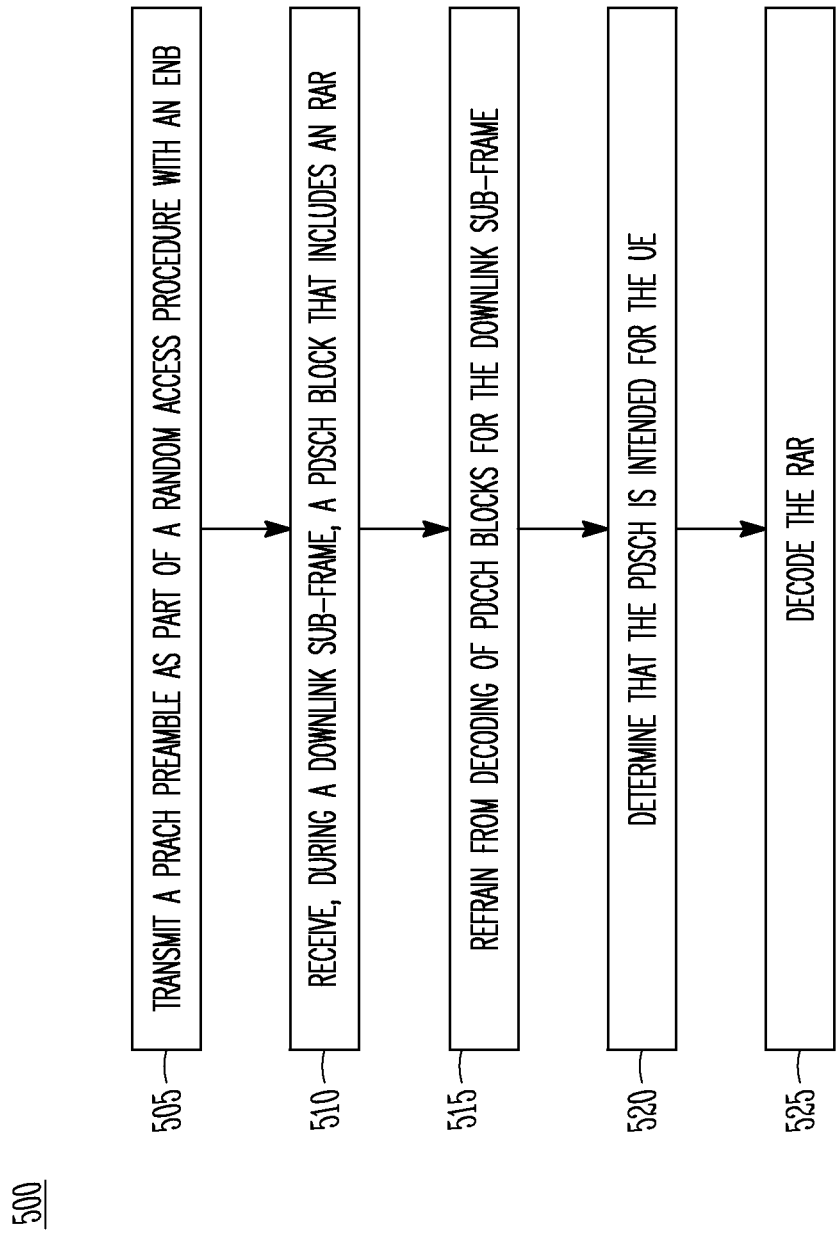
FIG. 5 illustrates the operation of a method of random access in accordance with some embodiments.

FIG. 5 illustrates the operation of a method of random access in accordance with some embodiments. It is important to note that embodiments of the method 500 may include additional or even fewer operations or processes in comparison to what is illustrated in FIG. 5. In addition, embodiments of the method 500 are not necessarily limited to the chronological order that is shown in FIG. 5. In describing the method 500, reference may be made to FIGS. 1-4 and 6-7, although it is understood that the method 500 may be practiced with any other suitable systems, interfaces and components. For example, reference may be made to the random access procedures 400, 450 in FIG. 4 described earlier for illustrative purposes, but the techniques and operations of the method 500 are not so limited.

In addition, while the method 500 and other methods described herein may refer to eNBs 104 or UEs 102 operating in accordance with 3GPP or other standards, embodiments of those methods are not limited to just those eNBs 104 or UEs 102 and may also be practiced on other mobile devices, such as a Wi-Fi access point (AP) or user station (STA). Moreover, the method 500 and other methods described herein may be practiced by wireless devices configured to operate in other suitable types of wireless communication systems, including systems configured to operate according to various IEEE standards such as IEEE 802.11. In addition the method 500 and other methods described herein may be practiced by UEs 102 or other devices that support or are configured to support Machine Type Communication (MTC) operation.

At operation 505 of the method 500, a physical random access channel (PRACH) preamble may be transmitted by the UE 102. The transmission may be performed as part of a random access procedure with an Evolved Node-B (eNB) as previously described. The transmission may be performed in PRACH time and frequency resources allocated for or reserved for PRACH preamble transmissions. In some embodiments, the resources may include or may be divided into multiple portions, which may be exclusive to or at least partly orthogonal to each other. Accordingly, each portion may be reserved for a different PRACH preamble transmission. The PRACH preamble may be included in 3GPP or other standards, although the scope of the embodiments is not limited in this respect.

In some embodiments, time resources included in the PRACH resources may include one or more time slots, sub-frames, symbols, OFDM symbols or similar, or fractions of such. In addition, frequency resources included in the PRACH resources may include one or more sub-carriers, resource elements (REs), resource blocks (RBs), channels, frequency bands or other, or fractions of such. Accordingly, a portion of the PRACH resources may include a subset of the PRACH time resources and a subset of the PRACH frequency resources. As an example, a portion may include a set of REs distributed throughout one or more RBs and one or more OFDM symbols. In addition, labels such as "first" or "second" or similar may be used for clarification purposes, but are not limiting in terms of time index or frequency index. For instance, a "first portion" may be a portion of PRACH resources used by a "first UE" and may be associated with a "first RA-RNTI." The first portion may not necessarily include the earliest PRACH time resources or the PRACH resources that are lowest in frequency.

At operation 510, a physical downlink shared channel (PDSCH) block may be received from the eNB 104 during a downlink sub-frame. In some embodiments, the PDSCH block may include a random access response (RAR), which may indicate a reception of the PRACH preamble by the eNB 104, as previously described. The RAR may be or may include an "Msg2" or other message type that may be included in 3GPP or other standards, although the scope of the embodiments is not limited in this respect.

At operation 515, the UE 102 may refrain from decoding of physical downlink control channel (PDCCH) blocks for the downlink sub-frame. That is, the PDSCH block may be received by the UE 102 without reception of a corresponding PDCCH block. Such a technique may enable or may be part of "PDCCH-less" operation in some cases. Although the concept of PDCCH-less operation is applied to the random access procedure in this discussion, it is not so limited, and may be utilized in other scenarios. For instance, the concepts may be applied to the usage of PDSCH blocks for exchanging of data packets or traffic packets between the UE 102 and the eNB 104.

In some embodiments, the eNB 104 may refrain from transmission of a PDCCH block corresponding to the transmitted PDSCH block, a decision that may be based on knowledge that the UE 102 is configured for PDCCH-less operation or MTC operation. In turn, the UE 102 may receive the PDSCH without searching for or attempting to receive a corresponding PDCCH. As a non-limiting example, the PDSCH block may be included in one or more downlink signals for the downlink sub-frame. The downlink signals may be configured such that a PDCCH for the PDSCH is not included. The downlink signals may be further configured such that when one or more PDCCH blocks are included in the downlink signals, the PDCCH blocks are associated with reception of PDSCH blocks different from the PDSCH block received by the UE 102. The downlink signals may be further configured such that any PDCCH block included in the downlink signals (if any) is associated with a different PDSCH block not intended for the UE 102.

As a non-limiting example, the downlink signals may include one or more OFDM signals that span a group of OFDM symbols in time. In some cases, a first portion of the group of OFDM symbols may include one or more PDCCH blocks associated with PDSCH blocks not intended for the UE 102. However, PDCCH blocks associated with the PDSCH block intended for the UE 102 may be excluded from the downlink signals. The PDSCH block intended for the UE 102 may be included in a second, later portion of the group of OFDM symbols that is non-overlapping with the first portion. Such a configuration may be included in 3GPP or other standards, but is not limited as such.

In some embodiments, the PDCCH-less operation may include refraining from decoding of PDCCH blocks by the UE 102, even when they are transmitted by the eNB 104. That is, the UE 102 may receive the PDSCH block without attempting to receive the corresponding PDCCH block, although it may actually be included in the downlink signals. As a non-limiting example, the downlink signals may include one or more OFDM signals that span a group of OFDM symbols in time. A first portion of the group of OFDM symbols may include a PDCCH block that includes reception information for the PDSCH block intended for the UE 102. The PDSCH block may be included in a second, later portion of the group of OFDM symbols that is non-overlapping with the first portion. Accordingly, the UE 102 may perform decoding functionality for the second portion of the OFDM symbols to receive the PDSCH block without attempting to receive the PDCCH block.

At operation 520, the UE 102 may determine whether or not the PDSCH block is intended for the UE 102 through the use of a first random access radio network temporary identifier (RA-RNTI). In some cases, it may also be determined whether or not the RAR included in the PDSCH block is intended for the UE 102. At operation 525 of the method 500, the RAR may be decoded when it is determined that the RAR is intended for the UE 102. This decoding operation may include or may be part of decoding of other blocks such as the PDSCH block or other.

The RA-RNTI may be known at the UE 102, as it may be a function of the portion of PRACH resources used by the UE 102 for transmission of the PRACH preamble. As a non-limiting example, the RA-RNTI may be determined as (1+t_id+10*f_id), in which t_id is a time index of the first sub-frame of the transmitted PRACH preamble and f_id is a frequency index for the transmitted PRACH preamble. It should be noted that other methods of determining the RA-RNTI may also be used, some of which may be based on parameters such as t_id, f_id or others. In some embodiments, RA-RNTIs for each portion of the PRACH time and frequency resources (as previously described) may be different. As an example, the first portion of PRACH resources used by the UE 102 for PRACH preamble transmission may be associated with a first RA-RNTI, which may be reflected in the transmitted PDSCH block, as will be described below.

Accordingly, the PDSCH block may be based at least partly on the first RA-RNTI to indicate that the PDSCH block is intended for the UE 102, examples of which will be given below. The eNB 104 may apply the RA-RNTI to the PDSCH block in some manner, may include the RA-RNTI in the PDSCH block or may "tag" the PDSCH block with the RA-RNTI to indicate that the PDSCH block is intended for the UE 102. This indication may enable the UE 102 to determine that the PDSCH block is intended for the UE 102 without the use of a PDCCH block for the PDSCH block. That is, a PDCCH block that is based on the RA-RNTI may not be needed by the UE 102 as part of the determination process.

Figure 6:
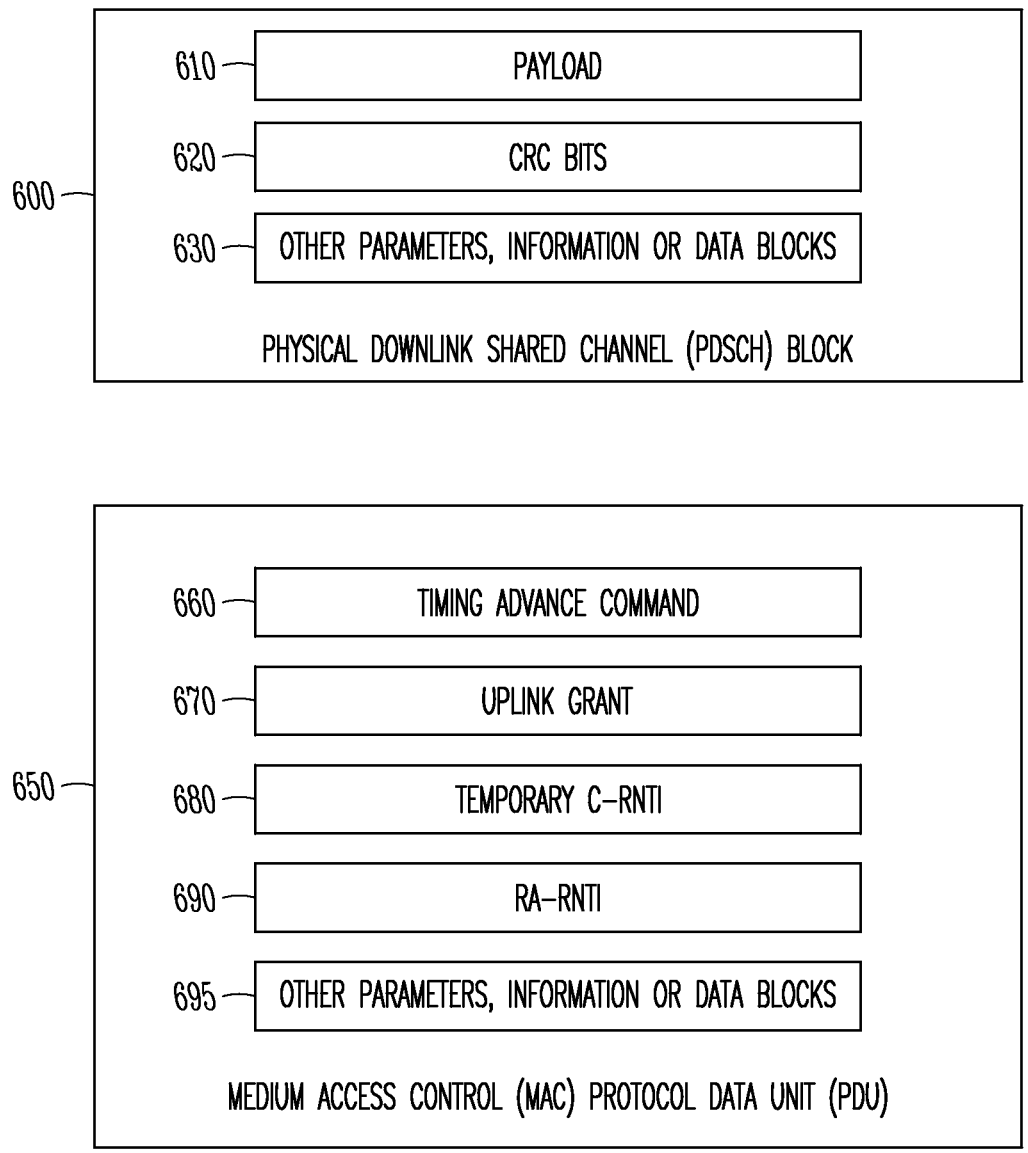
FIG. 6 illustrates examples of a physical downlink shared channel (PDSCH) block and a medium access control (MAC) protocol data unit (PDU) in accordance with some embodiments.

FIG. 6 illustrates examples of a physical downlink shared channel (PDSCH) block and a medium access control (MAC) protocol data unit (PDU) in accordance with some embodiments. The examples shown in FIG. 6 may be used to illustrate concepts associated with operation 520 or other operations, but the scope of the embodiments is not limited by these examples. In addition, formats and arrangements of the messages and parameters as shown in FIG. 6 are also not limiting.

Referring to FIG. 6, the PDSCH block 600 may include a payload 610, which may include the RAR. The PDSCH block 600 may also include CRC bits 620, which may result from application of a CRC operation to the payload 610 or to a portion of it. The PDSCH block 600 may also include any number (including zero) of other parameters, information or data blocks 630, which may or may not be related to random access messages or to techniques and operations described herein.

The RAR may include the MAC PDU 650 or similar PDU or data block, and may therefore be included in the payload 610 of the PDSCH 600, in some cases. The MAC PDU 650 may include any or all of the parameters shown in FIG. 6. The MAC PDU 650 may also include other similar parameters in addition to, or instead of, some of those parameters shown. Although not explicitly shown in FIG. 6, the MAC PDU 650 may comprise a header portion and a payload portion, and the parameters shown may be included in one portion or the other in some cases. The RA-RNTI 690 may therefore be included in the payload of the MAC PDU 650 in some embodiments, but may be included in the header portion of the MAC PDU 650 in some other embodiments.

The timing advance command 660 may include information or commands related to a propagation delay between the UE 102 and the eNB 104. The uplink grant 670 may include information related to a message transmission by the UE 102, such as the "Msg-3" previously described or other message. The cell radio network temporary identifier (C-RNTI) 680 may include an RNTI associated with a cell served by the eNB 104. In addition, any number (including zero) of other parameters, information or data blocks 695, which may or may not be related to random access messages or to techniques and operations described herein, may also be included in the MAC PDU 650.

As an example, the determination of whether or not the PDSCH is intended for the UE 102 may be related to scrambling of the CRC bits 620 by the RA-RNTI. The CRC bits 620, or at least a portion of them, may be scrambled with the RA-RNTI before the PDSCH block 600 is transmitted to the UE 102. Accordingly, the UE 102 may use the RA-RNTI to descramble the decoded CRC bits 620, or the scrambled portion of it. In some cases, a successful CRC check may indicate that the PDSCH block 600 is intended for the UE 102.

The scrambling operation may include the use of a "logical XOR" operation, which is determined as XOR(a, b)=(a+b)mod-2 for two binary numbers a and b. As an example, when the number of RA-RNTI bits is less than the number of CRC bits 620, the scrambling may be performed on just a portion of the CRC bits 620 of the same size as the RA-RNTI. For instance, a 16-bit RA-RNTI given by [r(0), r(1), ... r(15)] may be scrambled with a 24-bit CRC given as [c(0), c(1), ... c(23)] to give a scrambled result of [XOR(c(0), r(0)), XOR(c(1), r(1)) ... XOR(c(15), r(15)), c(16), ... c(23)]. As another example, the scrambling may be performed in a circular manner when the number of RA-RNTI bits is less than the number of CRC bits 620. For instance, the 16-bit RA-RNTI [r(0), r(1), ... r(15)] may be scrambled with the 24-bit CRC [c(0), c(1), ... c(23)] to give a scrambled result of [XOR(c(0), r(0)), XOR(c(1), r(1)) ... XOR(c(15), r(15)), XOR(c(16), r(0)), XOR(c(17), r(1)) ... XOR(c(23), r(7))]. These examples are not limiting, however, as any suitable technique for scrambling the RA-RNTI bits with the CRC bits 620 may be used.

As another example, the UE 102 may perform a comparison between the known or predetermined RA-RNTI and the decoded RA-RNTI 690 to determine if the PDSCH is intended for the UE 102. Accordingly, the RA-RNTI 690 may be included in the transmitted MAC PDU 650 to serve as an identifier for the intended recipient of the PDSCH block 600. As noted previously, the RA-RNTI 690 may be included in the header portion or payload portion of the transmitted MAC PDU 650. The comparison may therefore be performed between the known RA-RNTI and the decoded header or the decoded payload, as appropriate.

As another example, the first RA-RNTI associated with the first portion of the PRACH resources may be used for generation of a data scrambling sequence. For instance, the first RA-RNTI may be used as a seed value or other input in such a generation process. The data scrambling sequence may be applied to at least a portion of a data block associated with the RAR, such as the payload 610 of the transmitted PDSCH block 600, the payload portion of the MAC PDU 650 or any other suitable block. The scrambling process may include the use of "logical XOR" or other suitable operation. Accordingly, the UE 102 may perform a descrambling operation on the appropriate portion of the decoded payload 610 or other received block.

Figure 7:
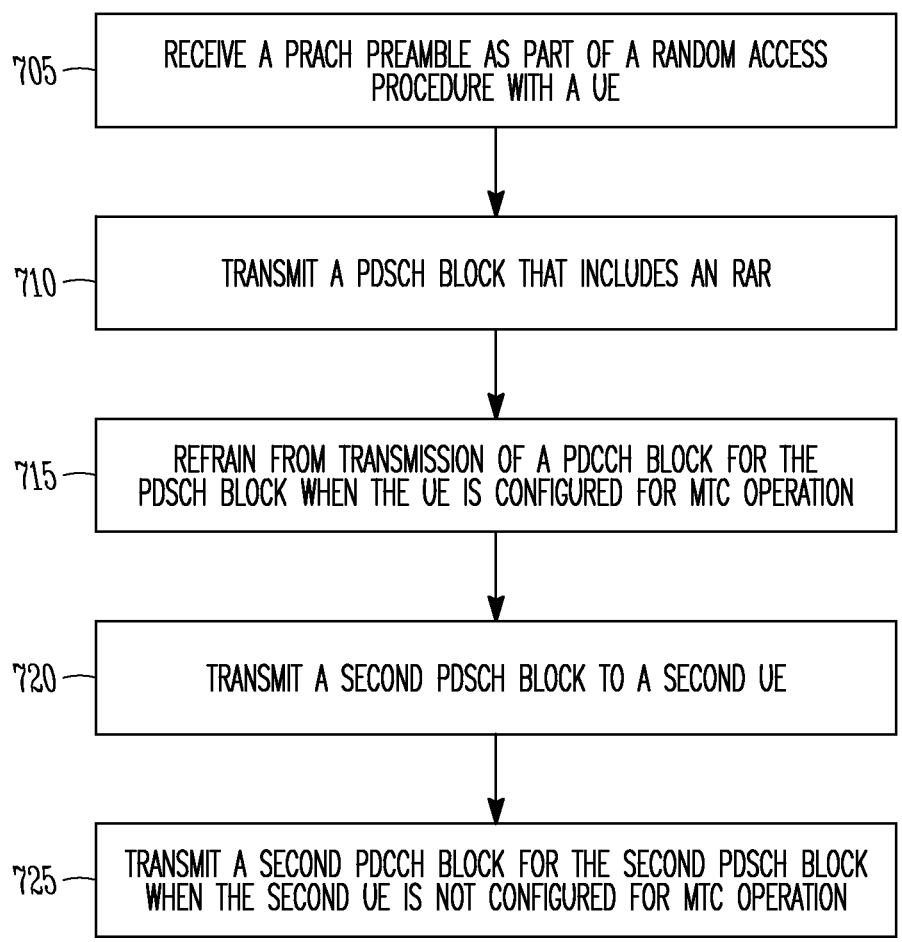
FIG. 7 illustrates the operation of another method of random access in accordance with some embodiments.

FIG. 7 illustrates the operation of another method of random access in accordance with some embodiments. As mentioned previously regarding the method 500 (FIG. 5), embodiments of the method 700 may include additional or even fewer operations or processes in comparison to what is illustrated in FIG. 7 and embodiments of the method 700 are not necessarily limited to the chronological order that is shown in FIG. 7. In describing the method 700, reference may be made to FIGS. 1-6, although it is understood that the method 700 may be practiced with any other suitable systems, interfaces and components. For example, reference may be made to the random access procedures 400, 450 in FIG. 4 described earlier for illustrative purposes, but the techniques and operations of the method 700 are not so limited. In addition, embodiments of the method 700 may refer to eNBs 104, UEs 102, APs, STAs or other wireless or mobile devices.

It should be noted that the method 700 may be practiced at the eNB 104, and may include exchanging of signals or messages with the UE 102. Similarly, the method 500 may be practiced at the UE 102, and may include exchanging of signals or messages with the eNB 104. In some cases, operations and techniques described as part of the method 500 may be relevant to the method 700. For instance, an operation of the method 500 may include reception of a message by the UE 102 while an operation of the method 700 may include transmission of the same message or a similar message at the eNB 104. In addition, previous discussion regarding concepts such as PRACH preambles, PDSCH blocks, MAC PDUs, RA-RNTIs, and other concepts may also be applicable.

At operation 705 of the method 700, a PRACH preamble may be received in a first portion of PRACH time and frequency resources as part of a random access procedure with the first UE 102. At operation 710, a PDSCH block that includes an RAR for the PRACH preamble may be transmitted, for reception at the first UE 102. Previously described concepts regarding similar or analogous operations for the method 500 may be applicable, although the scope of the embodiments is not limited in this respect.

The PDSCH block may be based at least partly on a first RA-RNTI associated with the first portion of the PRACH resources. Accordingly, the eNB 104 may apply the first RA-RNTI to the PDSCH block or may tag the PDSCH block with the first RA-RNTI, which may enable determination by the first UE 102 that the PDSCH block is intended for the first UE 102. As an example, at least a portion of a cyclic redundancy check (CRC) block included in the PDSCH block may be scrambled by the first RA-RNTI. As another example, the PDSCH block may include a MAC PDU that includes the first RA-RNTI. As another example, a data scrambling sequence may be applied by the eNB 104 to at least a portion of a data payload (such as the payload of the MAC PDU), and the data scrambling sequence may be a function of the first RA-RNTI. For instance, the first RA-RNTI may be used as a seed value or other input to a generation function.

At operation 715, the eNB 104 may refrain from transmission of a PDCCH block for the PDSCH block when the first UE 102 is configured for Machine Type Communication (MTC) operation. Accordingly, the previously described PDCCH-less operation may be realized for MTC UEs 102. In some embodiments, however, the first UE 102 may not be configured for MTC operation and the eNB 104 may still refrain from transmission of the PDCCH block for the PDSCH block to enable PDCCH-less operation for the first UE 102. That is, MTC operation is not necessarily a requirement for PDCCH-less operation.

At operation 720, a second PDSCH block may be transmitted to a second UE 102. A second PDCCH block that includes reception information for the second PDSCH block may be transmitted at operation 725 when the second UE 102 is not configured for MTC operation. Accordingly, the eNB 104 may use a PDCCH for communication with the second UE 102 and may simultaneously support PDCCH-less operation by the first UE 102. In some embodiments, the eNB 104 may support multiple UEs 102 operating in each of the above modes.

An example of User Equipment (UE) is disclosed herein. The UE may comprise hardware processing circuitry configured to transmit, as part of a random access procedure with an Evolved Node-B (eNB), a physical random access channel (PRACH) preamble in a first portion of PRACH time and frequency resources. The hardware processing circuitry may be further configured to receive a physical downlink shared channel (PDSCH) block from the eNB during a downlink sub-frame, wherein the PDSCH block includes a random access response (RAR). The hardware processing circuitry may be further configured to refrain from decoding of physical downlink control channel (PDCCH) blocks for the downlink sub-frame. The PDSCH block may be based at least partly on a first random access radio network temporary identifier (RA-RNTI) to indicate that the PDSCH block is intended for the UE. The first RA-RNTI may be associated with the first portion of the PRACH time and frequency resources.

In some examples, the hardware processing circuitry may be further configured to determine that the PDSCH block is intended for the UE. The determination may include usage of the first RA-RNTI by the UE and may exclude decoding of PDCCH blocks that are based on the first RA-RNTI. In some examples, the PDSCH block received by the UE may be included in one or more downlink signals for the downlink sub-frame. When one or more PDCCH blocks are included in the downlink signals, the PDCCH blocks may be associated with reception of PDSCH blocks different from the PDSCH block received by the UE. In some examples, the RAR may indicate a reception of the PRACH preamble by the eNB. In some examples, the PRACH time and frequency resources may include multiple portions. Each portion may be reserved for a different PRACH preamble transmission and RA-RNTIs for each portion may be different.

In some examples, at least a portion of a cyclic redundancy check (CRC) block included in the PDSCH block may be scrambled by the first RA-RNTI. In some examples, the hardware processing circuitry may be further configured to descramble, using the first RA-RNTI, at least a portion of the CRC block to determine that the PDSCH data block is intended for the UE. In some examples, the PDSCH block may include a medium access control (MAC) protocol data unit (PDU) and the MAC PDU may include the RAR and a header that includes the first RA-RNTI. In some examples, the hardware processing circuitry may be further configured to determine that the PDSCH data block is intended for the UE based on a comparison of the header with the first RA-RNTI.

In some examples, at least a portion of the RAR may be scrambled by a data scrambling sequence that is based at least partly on the first RA-RNTI. In some examples, the first RA-RNTI may be used as a seed value for a process for generation of the data scrambling sequence. In some examples, the UE may be configured for Machine Type Communication (MTC) operation that reflects exchanging of small blocks of traffic data at an infrequent rate. The small blocks of traffic data may include fewer than 1000 bits and the infrequent rate may be less than once per minute.

In some examples, the UE may be further configured to operate according to a Third Generation Partnership Project (3GPP) protocol. The PRACH preamble may be a Msg-1 message included in the 3GPP LTE protocol, and the RAR may be a Msg-2 message included in the 3GPP LTE protocol. In some examples, the UE may further comprise one or more antennas configured to transmit the PRACH preamble and further configured to receive the PDSCH block.

An example of a method of random access performed by User Equipment (UE) is also disclosed herein. The method may comprise transmitting a physical random access channel (PRACH) preamble, receiving a physical downlink shared channel (PDSCH) block that includes a random access response (RAR) to the PRACH preamble, and applying a first random access radio network temporary identifier (RA-RNTI) to the PDSCH block to determine that the PDSCH block is intended for the UE. The first RA-RNTI may reflect a first portion of dedicated PRACH resources in which the PRACH preamble is transmitted.

In some examples, the PDSCH block may be received as part of one or more downlink signals for a downlink sub-frame. The PDSCH block may be based at least partly on the first RA-RNTI to enable determination by the UE, without the use of a physical downlink control channel (PDCCH) block for the PDSCH block, that the PDSCH block is intended for the UE. The method may further comprise refraining from decoding of physical PDCCH blocks included in the downlink signals. In some examples, the downlink signals may include one or more Orthogonal Frequency Division Multiplexing (OFDM) signals that span a group of OFDM symbols. The PDCCH block may be included in a first portion of the group of OFDM symbols and the PDSCH block may be included in a second, later portion of the group of OFDM symbols that is non-overlapping with the first portion.

In some examples, the dedicated PRACH resources may include multiple portions and RA-RNTIs for each of the portions may be different. In some examples, the method may further comprise decoding the RAR when it is determined that the RAR is intended for the UE. In some examples, the PDSCH block may include a medium access control (MAC) protocol data unit (PDU), and the MAC PDU may include the RAR and a header that includes the first RA-RNTI. In some examples, the PDSCH block may include a cyclic redundancy check (CRC) block and at least a portion of the CRC block may be scrambled by the first RA-RNTI.

An example of a non-transitory computer-readable storage medium that stores instructions for execution by one or more processors to perform operations for random access is also disclosed herein. The operations may configure the one or more processors to transmit a physical random access channel (PRACH) preamble as part of a random access procedure with an Evolved Node-B (eNB). The transmission may be performed in a first portion of PRACH time and frequency resources. The operations may further configure the one or more processors to receive a physical downlink shared channel (PDSCH) block from the eNB during a downlink sub-frame. The PDSCH block may include a random access response (RAR). The operations may configure the one or more processors to refrain from decoding of physical downlink control channel (PDCCH) blocks for the downlink sub-frame. The PDSCH block may be based at least partly on a first random access radio network temporary identifier (RA-RNTI) for the first portion of the PRACH time and frequency resources. In some examples, the PRACH time and frequency resources may include multiple portions, and each portion may be reserved for a different PRACH preamble transmission. RA-RNTIs for each portion may be different and at least a portion of a cyclic redundancy check (CRC) block included in the PDSCH block may be scrambled by the first RA-RNTI.

An example of an Evolved Node-B (eNB) is also disclosed herein. The eNB may comprise hardware processing circuitry configured to receive, in a first portion of PRACH time and frequency resources, a physical random access channel (PRACH) preamble as part of a random access procedure with User Equipment (UE). The hardware processing circuitry may be further configured to transmit, for reception at the UE, a physical downlink shared channel (PDSCH) block that includes a random access response (RAR) for the PRACH preamble. The PDSCH block may be based at least partly on a first random access radio network temporary identifier (RA-RNTI) for the first portion of the PRACH resources. The hardware processing circuitry may be further configured to refrain from transmission of a physical downlink control channel (PDCCH) block for the PDSCH block when the UE is configured for Machine Type Communication (MTC) operation. In some examples, the PDSCH block may be based at least partly on the first RA-RNTI to indicate that the PDSCH block is intended for the UE.

In some examples, the PRACH resources may include multiple portions and each portion may be associated with a different RA-RNTI. In some examples, at least a portion of a cyclic redundancy check (CRC) block included in the PDSCH block may be scrambled by the first RA-RNTI. In some examples, the PDSCH block may include a medium access control (MAC) protocol data unit (PDU) that includes the first RA-RNTI. In some examples, the hardware processing circuitry may be further configured to transmit a second PDSCH block to a second UE and transmit a second PDCCH block that includes reception information for the second PDSCH block when the second UE is not configured for MTC operation. In some examples, the eNB may further comprise one or more antennas configured to receive the PRACH preamble and further configured to transmit the PDSCH block.

The Abstract is provided to comply with 37 C.F.R. Section 1.72(b) requiring an abstract that will allow the reader to ascertain the nature and gist of the technical disclosure. It is submitted with the understanding that it will not be used to limit or interpret the scope or meaning of the claims. The following claims are hereby incorporated into the detailed description, with each claim standing on its own as a separate embodiment.

What is claimed is:

1. User Equipment (UE) comprising hardware processing circuitry configured to:
   transmit, as part of a random access procedure with an Evolved Node-B (eNB), a physical random access channel (PRACH) preamble in a first portion of PRACH time and frequency resources;
   receive a physical downlink shared channel (PDSCH) block from the eNB during a downlink sub-frame, wherein the PDSCH block includes a random access response (RAR); and
   refrain from decoding of physical downlink control channel (PDCCH) blocks for the downlink sub-frame,
   wherein the PDSCH block is based at least partly on a first random access radio network temporary identifier (RA-RNTI) to indicate that the PDSCH block is intended for the UE, and
   wherein the first RA-RNTI is associated with the first portion of the PRACH time and frequency resources.

2. The UE according to claim 1, the hardware processing circuitry further configured to determine that the PDSCH block is intended for the UE, wherein the determination includes usage of the first RA-RNTI by the UE and excludes decoding of PDCCH blocks that are based on the first RA-RNTI.

3. The UE according to claim 1, wherein:
   the PDSCH block received by the UE is included in one or more downlink signals for the downlink sub-frame; and
   when one or more PDCCH blocks are included in the downlink signals, the PDCCH blocks are associated with reception of PDSCH blocks different from the PDSCH block received by the UE.

4. The UE according to claim 1, wherein the RAR indicates a reception of the PRACH preamble by the eNB.

5. The UE according to claim 1, wherein:
   the PRACH time and frequency resources include multiple portions, each portion reserved for a different PRACH preamble transmission; and
   RA-RNTIs for each portion are different.

6. The UE according to claim 5, wherein at least a portion of a cyclic redundancy check (CRC) block included in the PDSCH block is scrambled by the first RA-RNTI.

7. The UE according to claim 6, the hardware processing circuitry further configured to descramble, using the first RA-RNTI, at least a portion of the CRC block to determine that the PDSCH data block is intended for the UE.

8. The UE according to claim 5, wherein:
   the PDSCH block includes a medium access control (MAC) protocol data unit (PDU);
   the MAC PDU includes the RAR and a header that includes the first RA-RNTI.

9. The UE according to claim 8, the hardware processing circuitry further configured to determine that the PDSCH data block is intended for the UE based on a comparison of the header with the first RA-RNTI.

10. The UE according to claim 5, wherein at least a portion of the RAR is scrambled by a data scrambling sequence that is based at least partly on the first RA-RNTI.

11. The UE according to claim 10, wherein the first RA-RNTI is used as a seed value for a process for generation of the data scrambling sequence.

12. The UE according to claim 1, wherein the UE is configured for Machine Type Communication (MTC) operation that reflects exchanging of small blocks of traffic data at an infrequent rate, wherein the small blocks of traffic data include fewer than 1000 bits and the infrequent rate is less than once per minute.

13. The UE according to claim 1, wherein the UE is further configured to operate according to a Third Generation Partnership Project (3GPP) LTE protocol, the PRACH preamble is a Msg-1 message included in the 3GPP LTE protocol, and the RAR is a Msg-2 message included in the 3GPP LTE protocol.

14. The UE according to claim 1, the UE further comprising one or more antennas configured to transmit the PRACH preamble and further configured to receive the PDSCH block.

15. A method of random access performed by User Equipment (UE), the method comprising:
   transmitting a physical random access channel (PRACH) preamble;
   receiving a physical downlink shared channel (PDSCH) block that includes a random access response (RAR) to the PRACH preamble; and
   applying a first random access radio network temporary identifier (RA-RNTI) to the PDSCH block to determine that the PDSCH block is intended for the UE,
   wherein the first RA-RNTI reflects a first portion of dedicated PRACH resources in which the PRACH preamble is transmitted.

16. The method according to claim 15, wherein:
   the PDSCH block is received as part of one or more downlink signals for a downlink sub-frame;
   the PDSCH block is based at least partly on the first RA-RNTI to enable determination by the UE, without the use of a physical downlink control channel (PDCCH) block for the PDSCH block, that the PDSCH block is intended for the UE; and
   the method further comprises refraining from decoding of physical PDCCH blocks included in the downlink signals.

17. The method according to claim 16, wherein:
   the downlink signals include one or more Orthogonal Frequency Division Multiplexing (OFDM) signals that span a group of OFDM symbols;
   the PDCCH block is included in a first portion of the group of OFDM symbols;

the PDSCH block is included in a second, later portion of the group of OFDM symbols that is non-overlapping with the first portion.

18. The method according to claim 15, wherein the dedicated PRACH resources include multiple portions and RA-RNTIs for each of the portions are different.

19. The method according to claim 15, the method further comprising decoding the RAR when it is determined that the RAR is intended for the UE.

20. The method according to claim 15, wherein the PDSCH block includes a medium access control (MAC) protocol data unit (PDU), and the MAC PDU includes the RAR and a header that includes the first RA-RNTI.

21. The method according to claim 15, wherein the PDSCH block includes a cyclic redundancy check (CRC) block and at least a portion of the CRC block is scrambled by the first RA-RNTI.

22. The method according to claim 18, wherein at least a portion of the RAR is scrambled by a data scrambling sequence that is based at least partly on the first RA-RNTI.

23. A non-transitory computer-readable storage medium that stores instructions for execution by one or more processors to perform operations for random access, the operations to configure the one or more processors to:
   transmit a physical random access channel (PRACH) preamble as part of a random access procedure with an Evolved Node-B (eNB), wherein the transmission is performed in a first portion of PRACH time and frequency resources;
   receive a physical downlink shared channel (PDSCH) block from the eNB during a downlink sub-frame, wherein the PDSCH block includes a random access response (RAR); and
   refrain from decoding of physical downlink control channel (PDCCH) blocks for the downlink sub-frame,
   wherein the PDSCH block is based at least partly on a first random access radio network temporary identifier (RA-RNTI) for the first portion of the PRACH time and frequency resources.

24. The non-transitory computer-readable storage medium according to claim 23, wherein:
   the PRACH time and frequency resources include multiple portions, each portion reserved for a different PRACH preamble transmission;
   RA-RNTIs for each portion are different; and
   at least a portion of a cyclic redundancy check (CRC) block included in the PDSCH block is scrambled by the first RA-RNTI.

25. An Evolved Node-B (eNB) comprising hardware processing circuitry configured to:
   receive, in a first portion of PRACH time and frequency resources, a physical random access channel (PRACH) preamble as part of a random access procedure with User Equipment (UE);
   transmit, for reception at the UE, a physical downlink shared channel (PDSCH) block that includes a random access response (RAR) for the PRACH preamble, wherein the PDSCH block is based at least partly on a first random access radio network temporary identifier (RA-RNTI) for the first portion of the PRACH resources; and
   refrain from transmission of a physical downlink control channel (PDCCH) block for the PDSCH block when the UE is configured for Machine Type Communication (MTC) operation.

26. The eNB according to claim 25, wherein the PDSCH block is based at least partly on the first RA-RNTI to indicate that the PDSCH block is intended for the UE.

27. The eNB according to claim 25, wherein the PRACH resources include multiple portions, each portion associated with a different RA-RNTI.

28. The eNB according to claim 27, wherein at least a portion of a cyclic redundancy check (CRC) block included in the PDSCH block is scrambled by the first RA-RNTI.

29. The eNB according to claim 27, wherein the PDSCH block includes a medium access control (MAC) protocol data unit (PDU) that includes the first RA-RNTI.

30. The eNB according to claim 27, wherein at least a portion of the RAR is scrambled by a data scrambling sequence that is based at least partly on the first RA-RNTI.

31. The eNB according to claim 25, the hardware processing circuitry further configured to:
   transmit a second PDSCH block to a second UE; and
   transmit a second PDCCH block that includes reception information for the second PDSCH block when the second UE is not configured for MTC operation.

32. The eNB according to claim 25, the eNB further comprising one or more antennas configured to receive the PRACH preamble and further configured to transmit the PDSCH block.

* * * * *